Patented Jan. 8, 1924.

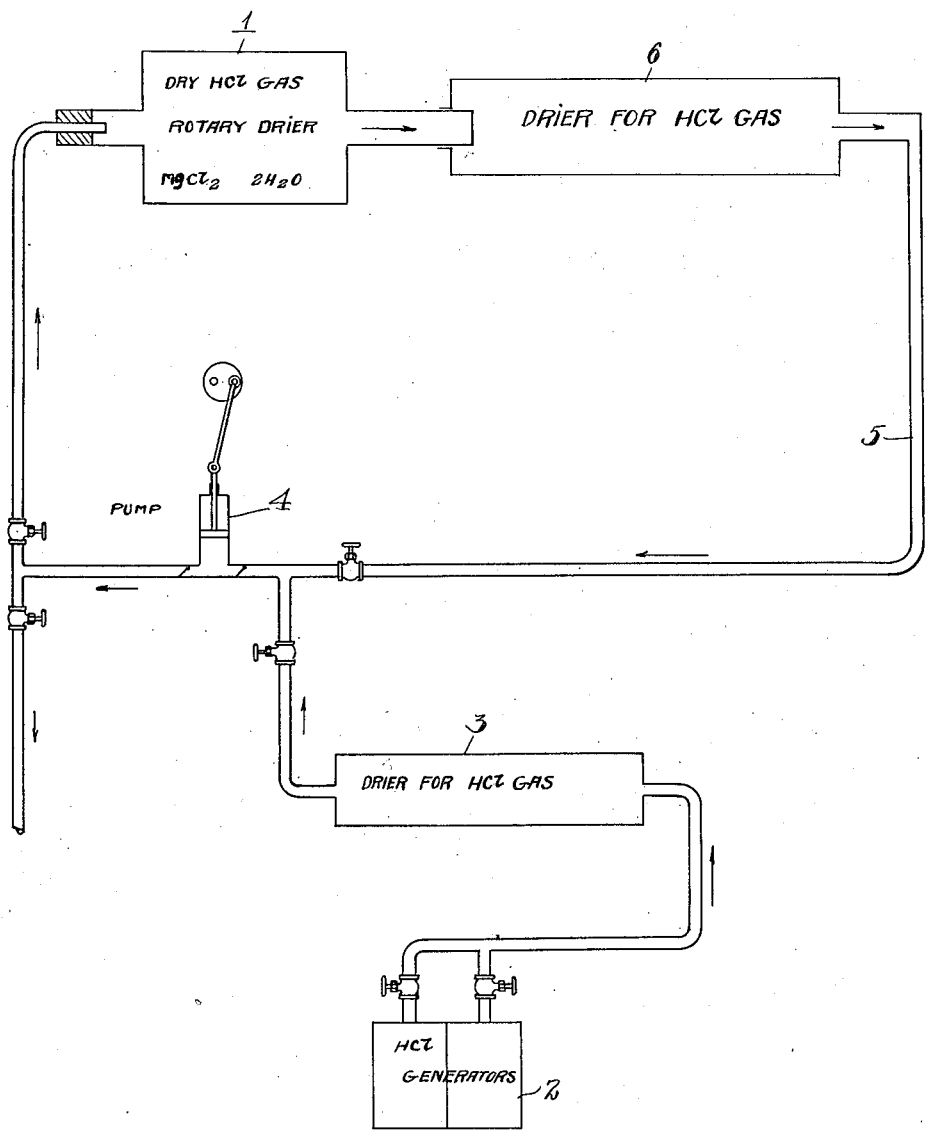

1,479,982

UNITED STATES PATENT OFFICE.

WILLIAM R. COLLINGS AND JOHN A. GANN, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ANHYDROUS MAGNESIUM CHLORIDE.

Application filed December 11, 1918. Serial No. 266,225.

*To all whom it may concern:*

Be it known that we, WILLIAM R. COLLINGS and JOHN A. GANN, citizens of the United States, and residents of Midland, county of Midland, State of Michigan, have jointly invented a new and useful Improvement in Methods of Making Anhydrous Magnesium Chloride, of which the following is a specification, the principle of the invention being herein explained and the best mode in which we have contemplated applying that principle, so as to distinguish it from other inventions.

As is well known, magnesium chloride ordinarily crystallizes out with six molecules of water ($MgCl_2.6H_2O$). This hydrate is decomposed on heating above 186° C., and while it is claimed that a partially dehydrated salt can be obtained by heating such hydrate to 175° C. in vacuum (see German Patent No. 161,662), the only methods for obtaining the anhydrous salt commercially have been to form the double magnesium ammonium salt by adding ammonium chloride to a solution of magnesium chloride, evaporating to dryness, carefully heating and finally igniting, or by evaporating a solution of magnesium chloride in a current of hydrochloric acid gas.

The present invention is based on the hitherto unutilized characteristics of the intermediate hydrates of magnesium chloride, namely the tetrahydrate ($MgCl_2.4H_2O$), and the dihydrate ($MgCl_2.2H_2O$), which may be successively obtained from the normal hydrate referred to above by heating at properly regulated temperatures, i. e. at temperatures best maintained just below points of incipient fusion of the materials being dried. We have also discovered the apparent existence of a monohydrate ($MgCl_2.H_2O$), which may be obtained from the dihydrate upon drying the latter in an atmosphere consisting at least in part of hydrochloric acid at a proper temperature, from which in turn the anhydrous salt is similarly produced. By a proper combination of steps we are accordingly able to eliminate two-thirds of the water of crystallization by direct drying in the open air, leaving only one-third to be removed with the use of hydrochloric acid gas. Furthermore, the stage involving the use of such gas is made a cyclical one, the gas being regenerated, or rather dried, so as to be available for use over and over again.

To the accomplishment of the foregoing and related ends, the invention, then, consists of the steps hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing, the single figure there appearing is a diagrammatic representation of an apparatus adapted for carrying out the latter stages of our improved process.

The first stage of our process, involving the drying of the magnesium chloride crystals ($MgCl_2.6H_2O$) to produce the dihydrate form, is not illustrated in the drawing, but is preferably accomplished in a single apparatus through which a current of air heated to the proper temperature is passed in a contrary direction to that in which the crystals are passed therethrough, although the material may be treated in batches, the temperature being gradually raised. Such stage, however, involves two steps, the air being maintained at a relatively low temperature, e. g. from 95° to 110° C. in the first step, with the result that two molecules of water are expelled, leaving the tetrahydrate. Following this, and without interruption between the two steps, in the second step of the air drying stage, by raising the temperature of the air slightly, viz to from 130° to 170° C., two more molecules of water are driven off, giving the dihydrate. While a considerable volume of heated air will be required in carrying out this preliminary or partial dehydration if the temperature of the salt is to be kept, as just indicated, below the point of incipient fusion, nevertheless treatment in this fashion presents a marked economy over any of the known commercial methods for even partially eliminating the water of crystallization from magnesium chloride.

The latter is thereupon transferred to the apparatus illustrated in the drawing, specifically to an externally heated rotary drier 1, wherein an atmosphere of hydrochloric acid gas is maintained, such gas being initially supplied from generators 2, whence it passes through a drying chamber 3 to a pump 4 connected in a closed circuit 5 with the aforesaid rotary drier 1 and a second drying chamber 6, the use of which will be presently explained. The temperature in said rotary drier is at first held at from 200° to 300° C., and then is raised, without interrupting the operation, to from 400° to 500° C. The effect of the application of the lower range of temperature is to abstract one molecule of water, while the second range completes the drying operation and leaves the anhydrous salt. These temperatures, as well as those previously given, are chosen so as to be below the incipient fusion point of the material being dried. The second chamber, into which the hydrochloric acid gas passes directly after leaving the drier, is supplied with a quantity of the dihydrate ($MgCl_2.2H_2O$), and is maintained at such a temperature as will allow such dihydrate to act as a drying agent by absorbing the moisture in the hydrochloric acid gas, thus:—

$$MgCl_2.2H_2O + 2H_2O \rightarrow MgCl_2.4H_2O.$$

The gas may accordingly be pumped over again into the drying chamber 1; in fact a continuous circulation of the gas is maintained by means of the pump 4, such gas alternately taking up moisture in the drier 1 and depositing it in the chamber 6. The dihydrate is similarly used as a drying agent in the chamber 3 between the hydrochloric acid generators 2 and the pump 4, it being understood that upon conversion of approximately all of the dihydrate in either of these chambers to one having a water content represented by four molecules of water, such hydrate is removed to be dried in the first stage of the process and fresh hydrate substituted for use in the second stage.

By means of the foregoing steps and apparatus we have found it possible to prepare the valuable anhydrous magnesium chloride at a much lower cost than has heretofore been possible, since, as already explained, the bulk of the water of crystallization is driven off by ordinary air drying, leaving only one-third to be removed with the use of hydrochloric acid gas. By employing in the second stage the intermediate hydrate as a drier for removing moisture from this gas, the latter may be used over and over again in the final dehydration step, subject only to the replenishing of such losses as occur owing to leakage and the like.

In all cases where the drying is carried out to form a certain hydrate or where a certain hydrate is charged into a given part of the apparatus, we do not limit ourselves to a hydrate of exactly this theoretical amount of water but have used these terms (monohydrate, dihydrate, etc.,) merely to indicate the relative approximate stage of the drying. For example—the salt used in the drying chambers may vary in water content between that represented by 2.0 and 2.5 molecules of water of crystallization, the temperature of fusion of such salt in this stage of dehydration lying above 250° C.

Other modes of applying the principle of our invention may be employed instead of the one explained, change being made as regards the steps herein disclosed, provided those stated by any of the following claims or their equivalents be employed.

We therefore particularly point out and distinctly claim as our invention:—

1. The method of making anhydrous magnesium chloride, which consists in heating the hexahydrate salt in air to drive off a portion of the water of crystallization, the temperature during such heating being kept below the point of incipient fusion of the material; and then heating the resulting product in an atmosphere of hydrochloric acid gas to completely dehydrate the same.

2. The method of making anhydrous magnesium chloride, which consists in heating the hexahydrate salt in air until approximately two-thirds of the water of crystallization is driven off; and then heating the resulting product in an atmosphere of hydrochloric acid gas until the same is completely dehydrated.

3. The method of making anhydrous magnesium chloride, which consists in heating the hexahydrate salt in air to drive off a portion of the water of crystallization; heating the resulting product in an atmosphere of hydrochloric acid gas to completely dehydrate the same; abstracting the water taken up by such gas with a portion of the partially dehydrated salt; and then using such gas over again with another portion of such partially dehydrated salt.

4. The method of making anhydrous magnesium chloride, which consists in heating the hexahydrate salt in air to drive off two-thirds of the water of crystallization; heating the resulting dihydrate in an atmosphere of hydrochloric acid gas to completely dehydrate the same; abstracting the water taken up by such gas with a portion of the dihydrate; and then using such gas over again with another portion of such dihydrate.

5. In a method of dehydrating normal magnesium chloride, the step which consists in drying the same in air, first at a low temperature (95° to 110° C.), and then at a moderate temperature (130° to 170° C.), substantially as described.

6. In a method of dehydrating normal magnesium chloride, the step which consists in drying the same in air, first at a low temperature (95° to 110° C.), and then at a moderate temperature (130° to 170° C.); and thereupon drying the resultant product further in an atmosphere of hydrochloric acid gas.

7. The method of dehydrating normal magnesium chloride, which consists in drying the same in air, first at a low temperature (95° to 110° C.), and then at a moderate temperature (130° to 170° C.); and thereupon drying the resultant product further in an atmosphere of hydrochloric acid gas, first at a temperature of from 200° to 300° C., and then at a temperature of from 400° to 500° C.

8. The method of dehydrating normal magnesium chloride, which consists in drying the same in air, first at a low temperature (95° to 110° C.), and then at a moderate temperature (130° to 170° C.); thereupon drying the resultant product further in an atmosphere of hydrochloric acid gas; abstracting the water taken up by such gas with a portion of the air-dried product; and then using such gas over again with another portion of such product.

9. In a method of making anhydrous magnesium chloride, the steps which consists in driving off a portion of the water of crystallization from the normal hydrated salt by heated air; and then completing the dehydration with a current of hydrochloric acid gas.

10. In a method of making anhydrous magnesium chloride, the steps which consist in driving off the major portion of the water of crystallization from the normal hydrated salt by heated air; and then completing the dehydration with a current of hydrochloric acid gas.

11. In a method of making anhydrous magnesium chloride, the steps which consist in driving off the water of crystallization from the normal hydrated salt by heated air until it is reduced to substantially the dihydrate; and then completing the dehydration with a current of hydrochloric acid gas.

12. In a method of making anhydrous magnesium chloride, the steps which consist in driving off the water of crystallization from the normal hydrated salt by heated air through a temperature range from approximately 95° to 170° C.; and then completing the dehydration with a current of hydrochloric acid gas through a temperature range from approximately 200° to 500° C.

13. In a method of making anhydrous magnesium chloride, the steps which consist in driving off water of crystallization from the partially dehydrated salt with a current of hydrochloric acid gas; abstracting the water taken up by such gas; and then using such gas over again in the first step.

14. In a method of making anhydrous magnesium chloride, the steps which consist in driving off water of crystallization from the partially dehydrated salt with a current of hydrochloric acid gas; abstracting the water taken up by such gas with a portion of such partially dehydrated salt; and then using such gas over again in the first step.

15. In processes for the manufacture of anhydrous magnesium chloride from the hydrated compound, in which processes hydrochloric acid gas is employed to absorb or remove the water of crystallization; partially dehydrating the said hydrated compound so that the temperature of fusion is raised to above 250° centigrade and afterward applying a slow current of hydrochloric acid gas to absorb and remove the remaining water of hydration.

16. In a process in accordance with claim 15, the removal of a portion of the water of hydration by a voluminous current of heated air and following such treatment by the application of a slow current of hydrochloric acid gas, substantially as hereinbefore described.

17. In a process in accordance with claim 15, carrying out the first stage of the process only until such amount of water has been removed from the initial material that the fusion point is raised to 250° centigrade, or thereabout, and no hydrochloric acid has been liberated.

18. In a process in accordance with claim 15, effecting the preliminary partial dehydration and heating of the hydrated compound solely by means of a very voluminous current of heated air.

Signed by us, this 5th day of December, 1918.

WILLIAM R. COLLINGS.
JOHN A. GANN.